United States Patent [19]

Hubert et al.

[11] Patent Number: 5,263,666
[45] Date of Patent: Nov. 23, 1993

[54] SPACECRAFT WITH INCREASED STATIONKEEPING FUEL LOAD

[75] Inventors: Susan M. Hubert, Cranbury; Keith Davies, Robbinsville, both of N.J.

[73] Assignee: General Electric Co., East Windsor, N.J.

[21] Appl. No.: 285,699

[22] Filed: Dec. 16, 1988

[51] Int. Cl.$^5$ ............................................. B64G 1/40
[52] U.S. Cl. ................................... 244/172; 244/169; 244/62
[58] Field of Search ...................... 244/172, 169, 62

[56] References Cited

U.S. PATENT DOCUMENTS

| | | | |
|---|---|---|---|
| 3,231,223 | 1/1966 | Upper | 244/169 |
| 3,807,657 | 4/1974 | Brill . | |
| 3,923,188 | 12/1975 | Lake, Jr. . | |
| 4,741,502 | 5/1988 | Rosen | 244/172 |
| 4,787,579 | 11/1988 | Smith | 244/169 |

FOREIGN PATENT DOCUMENTS

| | | |
|---|---|---|
| 8704992 | 8/1987 | European Pat. Off. . |
| 8707877 | 12/1987 | European Pat. Off. . |
| 2197118 | 3/1974 | France . |
| 1439368 | 6/1976 | United Kingdom . |
| 2190141 | 11/1987 | United Kingdom . |

Primary Examiner—Joseph F. Peters, Jr.
Assistant Examiner—Christopher P. Ellis
Attorney, Agent, or Firm—W. H. Meise; C. A. Berard; S. A. Young

[57] ABSTRACT

A spacecraft includes bipropellant and monopropellant engines or thrusters. The oxidizer-fuel mixture ratio of the bipropellant engine is not known exactly. The spacecraft is loaded with only sufficient oxidizer to achieve the velocity for transfer from an intermediate orbit to geosynchronous orbit if the mixture ratio is nominal. Therefore, more fuel can be loaded. If the bipropellant engine burn is nominal, there is no excess oxidizer when on-orbit and more fuel is available for stationkeeping. If the burn is oxidizer-rich, there is a velocity shortfall, which is made up by firing monopropellant engines. If the burn is oxidizer-lean, the geosynchronous orbit is achieved with a load of excess oxidizer, which must be moved during each stationkeeping maneuver. A net gain of stationkeeping time results in any of the three mixture ratio cases by comparison with loading of sufficient oxidizer for a full bipropellant burn under worst-case mixture conditions.

2 Claims, 1 Drawing Sheet

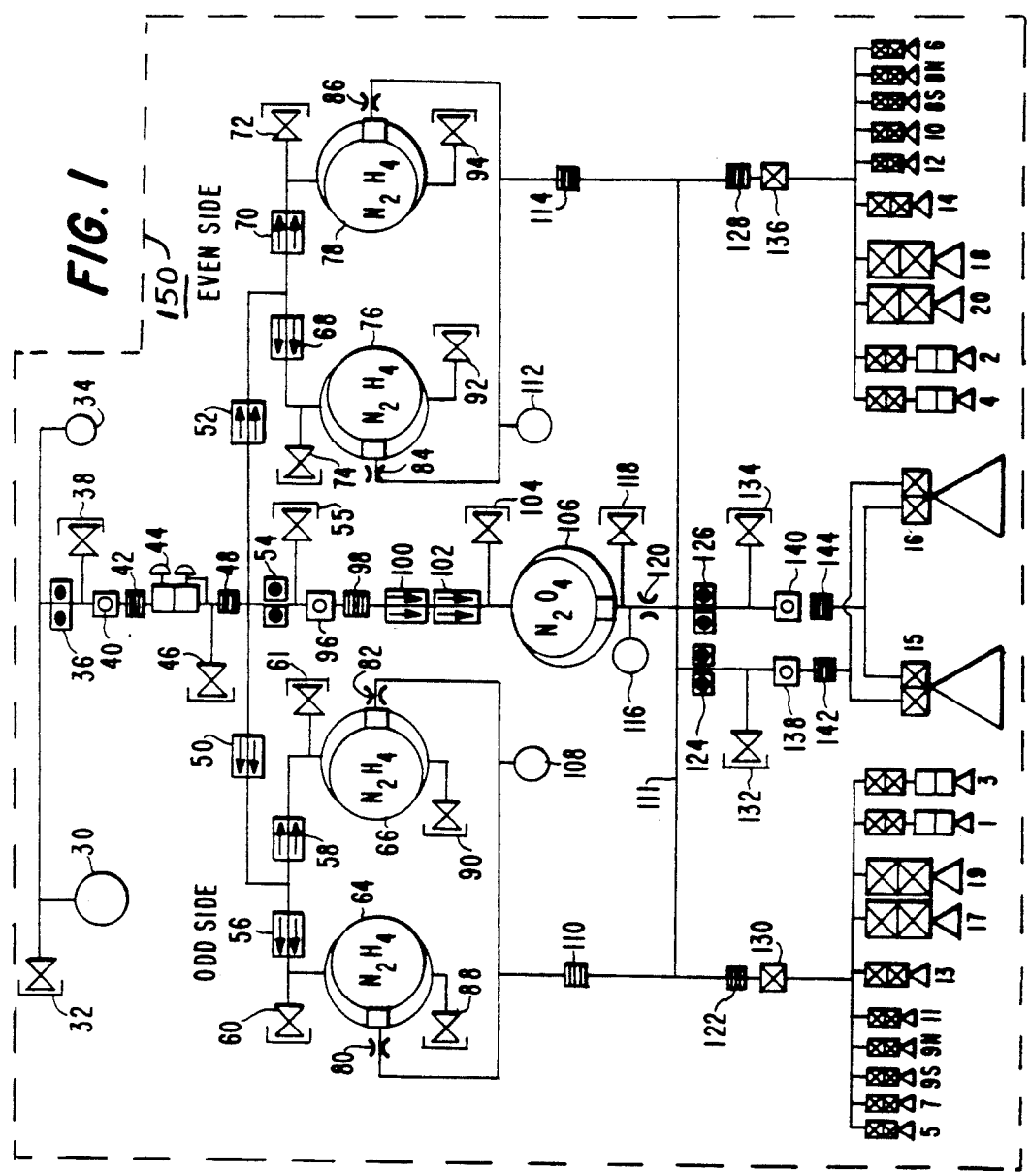

SPACECRAFT WITH INCREASED STATIONKEEPING FUEL LOAD

BACKGROUND OF THE INVENTION

This invention relates to spacecraft such as geostationary communications satellites which include thrusters for insertion into orbit and which also include thrusters for stationkeeping.

Satellite communications are widely used. For example, geostationary satellites placed in fixed equatorial orbits can provide communication over a broad geographic area. At present, a large amount of television distribution among terrestrial broadcast stations is accomplished by satellite. A typical communications satellite may include 10 to 40 wideband transponders, each of which may be leased for as much as $1 million per annum. Polarization isolation allows each transponder to be used for two partially overlapping signals, which effectively doubles the number of transponders. Thus, an operating satellite generates a great deal of revenue. Considering that manufacture and launch of a satellite may cost $50–100 million, it is imperative to get as much useful life from each satellite as is possible.

In the past, gradual degradation of equipment, together with random failures, tended to be the limiting factors in satellite life. Improvements in the reliability and life of satellite components has resulted in satellites which continue to operate until the fuel required to maintain station is exhausted. Thus, the useful life of a satellite may be directly related to the amount of stationkeeping fuel which can be loaded and launched. Great efforts are expended in minimizing the weight of nonessential portions of the satellite so that the maximum amount of stationkeeping fuel may be loaded and launched.

In general, satellites may be launched by expendable boosters or by recoverable vehicles, such as a space shuttle. The manufacturer or operator of the launch vehicle, whether expendable or nonexpendable, specifies the weight of the satellite and the altitude at which it will be released. Very often, the satellite manufacturer provides a further booster, such as an apogee motor, to lift the vehicle from a low intermediate orbit at which the satellite is released to the desired orbit, as, for example, the 22,400 mile geostationary orbit. Thus, the satellite as it arrives at a low earth orbit includes an apogee motor for boost to the geostationary orbit together with some means for stationkeeping, which may include additional thrusters.

There are two general types of chemical thrusters; bipropellant and monopropellant. The bipropellant thruster uses a fuel and an oxidizer, as, for example, a monomethylhydrazine fuel ($CH_3N_2H_3$) and nitrogen tetroxide ($N_2O_4$) as an oxidizer. The bipropellant system provides more thrust per unit weight of propellant than a simple monopropellant system, i.e. it is more efficient in that it provides a greater velocity change per unit mass or weight of propellant (where the term propellant in this context includes both fuel and oxidizer). The monopropellant system includes a thruster having a catalyst which causes a chemical change when contacted by the monopropellant fuel, which in turn provides thrust. The simple monopropellant system is less efficient than the bipropellant system. The use of excess electrical energy to heat the combustion products can make low-thrust monopropellant engines as efficient as bipropellant engines. However, the amount of electrical energy necessary for large thrusters cannot be supplied, so for large-thrust engines, bipropellant engines continue to be more efficient.

Bipropellant fuel systems suffer from the disadvantage that the engine oxidizer-fuel mixture ratio is subject to errors which cannot be predicted, which may typically account for 3–5% of the total fuel load. Since the errors cannot ordinarily be predicted, the fuel and oxidizer tanks are preloaded with an amount of propellant predicted based upon taking into account the possibility of worst-case mixtures. Consequently, if the nominal conditions prevail, the fuel and oxidizer tanks would run dry simultaneously if the engine were run until it stopped for lack of propellant. However, as a result of the unpredictable errors in oxidizer-fuel mixture, it can be expected that one tank or the other will run dry first. Naturally, it is very desirable to optimize the system so as to fully utilize all of the fuel and oxidizer. Significant concerns exist regarding the chemical compatibility of oxidizer with typical materials used to contain the oxidizer over the 10-year satellite lifetime. Also, the products of combustion may be corrosive, especially if free oxidizer is released.

The monopropellant system has the advantage that all of the monopropellant can be used to provide a velocity change. Also, hydrazine monopropellant fuel is well characterized for long space missions, and the combustion products may be less corrosive than those of a bipropellant system. In order to take advantage of the efficiency of the bipropellant system in generating a velocity change and the full utilization achievable with the monopropellant system, dual-mode propulsion systems have been used. Such dual-mode systems include a relatively high-thrust bipropellant apogee engine and smaller monopropellant thrusters.

At launch, the tanks of satellites including such dual-mode propulsion systems are loaded with enough oxidizer to provide sufficient thrust for a predetermined velocity change ($\Delta V$) from the bipropellant apogee engine under worst-case engine mixture conditions. The weight is brought to the maximum allowable booster or shuttle launch weight with propellant.

SUMMARY OF THE INVENTION

In accordance with the invention, the oxidizer tank of a dual-mode spacecraft is loaded with only sufficient oxidizer to sustain bipropellant operation to achieve the predetermined $\Delta V$ for transition from a first or intermediate orbit to a second or geostationary orbit under nominal or ideal engine mixture conditions. This allows additional weight of monopropellant fuel to be loaded. The spacecraft bipropellant engine is operated to cause the spacecraft to gain velocity to leave the first orbit and move toward the second orbit. If nominal conditions prevail, the oxidizer runs out at exactly the right moment, thereby starting the final orbit with more monopropellant fuel than if the engine mixture errors were taken into account. If the engine runs oxidizer-rich, the oxidizer runs out and the bipropellant engine stops before achieving the desired $\Delta V$, in which case at least one the monopropellant thrusters are used to achieve the difference between the desired and actual $\Delta V$. Upon achieving the second orbit, monopropellant engines are used for stationkeeping. If the engine runs oxidizer-lean, the $\Delta V$ is achieved with oxidizer remaining in the tank, whereupon the monopropellant fuel required for stationkeeping is increased due to the increased mass of the oxidizer. In either oxidizer-rich or oxidizer-lean situations, the additional monopropellant fuel used for achieving the desired ΔV or for moving the additional mass during the expected lifetime of the satellite is less than the total amount of additional fuel and oxidizer load typically predicted to be required for non-dual mode propulsion systems. Hence, a net gain in stationkeeping time results, since the oxidizer mass onloaded to account for mixture ratio errors throughout non-dual mode missions is not required and an increased load of stationkeeping fuel may be substituted therefor.

DESCRIPTION OF THE DRAWING

FIG. 1 is a simplified block diagram of a dual-mode monopropellant-bipropellant propulsion system.

DESCRIPTION OF THE INVENTION

FIG. 1 is a block diagram of the fuel system of a spacecraft 150. In FIG. 1, generally speaking, fuel tanks 64, 66, 76 and 78 are loaded with hydrazine ($N_2H_4$) fuel, which is pressurized by helium supplied from a tank 30. An oxidizer tank 106 is also pressurized with helium from tanks 30. Fuel from tanks 64, 66, 76 and 78 is provided in a controlled fashion to any of monopropellant engines 1 through 14 and 18 through 20, and to bipropellant engines 15 and 16. Thus, all engines use the same fuel. Oxidizer is supplied in a controlled fashion from tank 106 to bipropellant engines 15 and 16.

The pressure in tank 30 is monitored by a pressure transducer 34. A service valve 32 provides access for loading tank 30 with helium. The helium in tank 30 is prevented from flowing to the fuel or oxidizer tanks during the boost to low earth orbit by dual or redundant, normally-closed pyrotechnic valves 36. After release from the booster, pyrotechnic valves 36 are fired to allow pressurization of the fuel and oxidizer tanks. A further service valve 38 allows testing of the system with valve 36 installed. A normally-open pyrotechnic valve is connected to a helium filter 42. Helium flowing from tank 30 through valves 36 and 40 and through filter 42 then passes through a dual redundant pressure regulator arrangement 44 and through a further filter 48. Service valve 46 provides additional access. From filter 48, the helium divides into three paths, flowing through dual redundant check valves 50 and 52 toward the fuel tanks, and through a path including a dual redundant normally-closed pyrotechnic valve 54. Helium flowing through check valve 50 flows through additional redundant check valves 56 and 58 to tanks 64 and 66, respectively. Service valves 60 and 88 are associated with tank 64, and service valves 62 and 90 are associated with tank 66. Similarly, helium flowing through check valve 52 flows through additional check valves 68, 70 to fuel tanks 76 and 78, respectively. Service valves 74 and 92 are associated with fuel tank 76, and service valves 72 and 94 are associated with fuel tank 78. Fuel can flow from tanks 64, 66, 76 and 78 by way of orifices 80, 82, 84 and 86, respectively, when there is a demand. Orifices 80 and 82 are connected together, and may be monitored by a pressure transducer 108. Similarly, orifices 84 and 86 are connected together and the fuel pressure may be monitored by a transducer 112. The fuel flowing from tanks 64 and 66 flows through a filter 110 and to a common fuel line 111. Fuel from tanks 76 and 78 flows through a filter 114 and to common fuel line 111. From fuel line 111, fuel is available to all engines.

When pyrotechnic valve 54 is fired, the valve opens to allow helium gas to flow past service valve 55 through a normally-open pyrotechnic valve 96, through a filter 98, through check valves 100 and 102 and past a service valve 104 to pressurize oxidizer tank 106. A pressure transducer 116 allows monitoring of the pressure in the tank, and service valve 118 provides access for filling or draining when appropriate. When there is demand for oxidizer, oxidizer exits tank 106 via an orifice 120. A further normally-closed pyrotechnic valve 126 prevents premature flow of oxidizer. When fired, valve 126 allows oxidizer to flow past a service valve 134 and a normally-open pyrotechnic valve 140 through a filter 144 to the control valves of bipropellant apogee engines 15 and 16.

A normally closed pyrotechnic valve 124 is fired after the booster has inserted the spacecraft into a low earth orbit, allowing fuel to flow from any of tanks 64, 66, 76 and 78 past a service valve 132 and through a normally open pyrotechnic valve 138 and a filter 142 to the fuel control valves of engines 15 and 16.

Fuel may also flow from common fuel line 111 through filters 122 and 128 to latch valves 130 and 136, which control fuel flow to engines 1 through 14 and 18 through 20, which are individually controllable.

Assuming the gross weight of the satellite as it arrives in a low earth orbit is 6,000 LbM (2721.6 kg), and that a total velocity change of 1851.1 meters per second (m/s) is necessary for the transition between low earth orbit and geosynchronous orbit, and that the nominal mixture ratio is 1.1 kilogram of oxidizer per kilogram of fuel, with a tolerance of ±0.035, and that the specific impulse $I_{SP}$ of the bipropellant engine is 312 seconds and that the $I_{SP}$ of the monopropellant engine is 302 seconds, it is possible to calculate the fuel and oxidizer load. The worst-case mixture ratio extremes of 1.065:1 and 1.135:1 would according to the prior art dictate an oxidizer load of 656.8 kg of oxidizer and 598.3 kg of fuel for a total propellant load of 1255.1 kg designated for apogee engine use. Additional fuel would be loaded for stationkeeping or attitude control use by monopropellant thrusters. With this load of oxidizer and fuel for the apogee engine, a nominal actual engine mixture ratio will result in 9.7 kilograms of oxidizer remaining in the oxidizer tank after achieving the desired velocity, and 10.0 kg of apogee-designated fuel remaining in the fuel tank. Thus, 588.3 kg of fuel were used. A worst-case oxidizer lean burn will result in 19.7 kilograms of oxidizer remaining in the oxidizer tank and no fuel designated to apogee burn remaining in the fuel tank. A worst-case oxidizer-rich burn will result in no oxidizer remaining in the oxidizer tank, and with 19.7 kg of excess fuel, i.e., fuel on-loaded for apogee burn but not consumed.

According to the invention, the initial oxidizer load placed in the fuel tank at launch is made equal to that required for the nominal engine burn requirement, which in the above example is 647.1 kilograms (i.e., 656.8 kg - 9.7 kg). In addition, according to the invention, the fuel load is made equal to that required for nominal engine burn, which in this example is 588.3 kg, plus an allowance for making up the velocity shortfall which may occur if the engine burn is not nominal. This allowance is 12.9 kg of fuel, thereby producing a total propellant load designated for the apogee burn of 1248.3 kg, which is 6.8 kg less than the propellant load in the prior art example. The satellite is brought up to the launch weight by adding an additional 6.8 kg of monopropellant fuel. If the apogee engine operates under nominal conditions, the desired velocity change will have been achieved at the moment that both the oxidizer and the apogee fuel are totally consumed, with the satellite arriving on-station with a gain of monopropellant fuel of 6.8 kilograms, plus the additional 12.9 kg, for a total of 19.7 kg net gain over the prior art, which is sufficient for as much as 9 additional months of stationkeeping operation. Thus, under nominal engine burn conditions, the propellant load according to the invention can provide up to 9 additional months of on-station life.

The engine may, however, not operate under nominal mixture conditions, for the exact mixture ratio of the bipropellant apogee engine is not known. Assume that the engine operates in an extreme oxidizer-rich mode. The thrust is essentially unaffected by the mixture ratio. The oxidizer tank will be depleted before the full $\Delta V$ is achieved, and there will be a shortfall of velocity of 37.2 m/s at the moment the oxidizer is fully consumed. Since the bipropellant apogee engine(s) ceases operation early, 18.2 kg of fuel which would otherwise have been consumed by the bipropellant engine remains unused. This fuel is then used for the monopropellant engines (oriented along the North-South and East-West axes) in order to at least partially make up the 37.2 m/s shortfall. In addition, another 12.9 kilograms of fuel is required by the monopropellant engines to totally make up the shortfall of 37.2 meters per second, for a total of 31.1 kilograms of fuel consumption. When compared to the prior art arrangement, the satellite arrives on-station with an additional fuel load of 6.8 kg which may be used to increase the spacecraft life for about 3.1 months. Thus, even under worst-case adverse engine burn conditions, a propellant load according to the invention provides more than 3 additional months of stationkeeping time.

Assume that the engine operates in an oxidizer-lean burn mode. In that case, there is no velocity shortfall, but not all the oxidizer is used, so that 10 kg of oxidizer remain in the tanks when the satellite arrives on-station. This 10 kg cannot be vented, because the oxidizer may be corrosive to the satellite. Consequently, it must be retained aboard for the entire duration of the satellite's operation. Assuming a 10-year life, this additional 10 kg becomes part of the mass of the satellite which must be moved at each stationkeeping maneuver. The additional mass requires use of more fuel during each stationkeeping maneuver. The additional fuel required over the life of the satellite is about 2.0 kg. However, this is much less than the 19.7 kg of additional fuel on-loaded in accordance With the invention, and the 17.7 kg difference can provide as much as 8 additional months of on-station time.

Other embodiments of the invention will be apparent to those skilled in the art. For example, the FIGURE illustrates a dual-mode or common-tank apogee-thruster/stationkeeping thruster arrangement, but the invention is equally applicable to satellites having completely independent apogee and stationkeeping thrusters. The monopropellant velocity make-up thrusters may be oriented along the same axis as the apogee engines, instead of N-S, E-W.

What is claimed is:

1. A method for launching a satellite including at least one nonadjustable fuel-oxidizer mixture ratio bipropellant engine which consumes both fuel and oxidizer and plural fuel-consuming monopropellant engines, comprising the steps of:

loading the satellite only with sufficient oxidizer for achieving velocity for transfer from a first orbit to a second desired orbit with said bipropellant engine operating at its nominal fuel-oxidizer mixture ratio;

loading said satellite with fuel to the maximum weight allowable for transfer to said first orbit;

operating said bipropellant engine to cause said spacecraft to gain velocity to leave said first orbit and move toward said second orbit;

if said oxidizer is depleted before achieving said velocity, operating at least one of said monopropellant engines for achieving said velocity; and upon achieving said second orbit, operating at least one of said monopropellant engines to maintain station.

2. A method according to claim 1 wherein said first orbit is an intermediate orbit and said second orbit is geosynchronous.

* * * * *